(12) United States Patent
Xiao

(10) Patent No.: US 12,179,829 B2
(45) Date of Patent: Dec. 31, 2024

(54) WRAPPER AND BABY CARRIAGE WITH MULTIPLE STORAGE STRUCTURE

(71) Applicant: WONDERLAND SWITZERLAND AG, Steinhausen (CH)

(72) Inventor: Lei Xiao, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 518 days.

(21) Appl. No.: 17/508,332

(22) Filed: Oct. 22, 2021

(65) Prior Publication Data

US 2022/0126903 A1 Apr. 28, 2022

(30) Foreign Application Priority Data

Oct. 23, 2020 (CN) .......................... 202022393754.1

(51) Int. Cl.
  *B62B 9/14* (2006.01)
  *B62B 7/06* (2006.01)
  *B62B 9/12* (2006.01)

(52) U.S. Cl.
  CPC .............. *B62B 9/142* (2013.01); *B62B 7/06* (2013.01); *B62B 9/12* (2013.01)

(58) Field of Classification Search
  CPC .............. B62B 9/142; B62B 9/12; B62B 7/06
  See application file for complete search history.

(56) References Cited

U.S. PATENT DOCUMENTS 6,298,993 B1 * 10/2001 Kalozdi .................... A45C 3/00
  206/581
7,789,413 B2 * 9/2010 Hei .......................... B62B 9/26
  280/47.38
D851,927 S * 6/2019 Ormsby ........................ D3/246
2007/0075510 A1 4/2007 Hei et al.
2018/0093692 A1 4/2018 Xu

FOREIGN PATENT DOCUMENTS

| CN | 109501847 A | 3/2019 | |
| CN | 109501847 B | * 7/2022 | ............... B62B 9/10 |
| TW | M444077 U | 1/2013 | |

OTHER PUBLICATIONS

Mechanical translation of CN109501847, Mar. 22, 2019.*
Taiwanese Office Action for Application No. 110139285 dated Jan. 9, 2022.

* cited by examiner

*Primary Examiner* — John D Walters
(74) *Attorney, Agent, or Firm* — Volpe Koenig

(57) ABSTRACT

The disclosure provides a wrapper. A front top of the wrapper is provided with a first opening for placing in and taking out goods, and a cover sheet for shielding the first opening is arranged at the first opening. A first connecting member is arranged on a back of the wrapper, and the wrapper is detachably connected to a carrier by the first connecting member. A wrapping strap is arranged on both sides of a back top of the wrapper, and the wrapping strap includes a length-adjustable structure. The wrapper may be mounted on the carrier to increase a storage space of the carrier and meet the need of placing goods by types, and the wrapper may still be used independently at the same time. The disclosure also provides a baby carriage with a multiple storage structure. The baby carriage has a large storage space and a plurality of placing-by-type-areas.

20 Claims, 7 Drawing Sheets

WRAPPER AND BABY CARRIAGE WITH MULTIPLE STORAGE STRUCTURE

TECHNICAL FIELD

The disclosure relates to children's carriers, and particularly to a wrapper and a baby carriage with a multiple storage structure.

BACKGROUND

In addition to being a means of transportation for taking a baby to go for a walk, a baby carriage is also a must for parents to take their baby to the street for shopping. However, if the parents take more goods, it will be difficult to pick them up, and this is especially true for the elderly and frail people. In order to enable parents to take their babies out for a walk and easily bring goods with them, at present, most baby carriages are designed with baskets for storing goods. However, if there are a plurality of types of goods and they need to be placed by types accordingly, it is difficult to meet the user's needs for storing goods and placing goods by types with a basket having only a limited space, resulting in inconvenience for the user in use and increasing the burden and difficulty offhand-taking.

Therefore, there is an urgent need for a wrapper and a baby carriage with a multiple storage structure, so as to overcome the deficiencies of the prior art.

SUMMARY

An object of the disclosure is to provide a wrapper. The wrapper may be mounted on a carrier to increase a storage space of the carrier and meet the need of placing goods by types, and the wrapper may be used independently at the same time.

Another object of the disclosure is to provide a baby carriage with a multiple storage structure. The stroller has a large storage space and a plurality of placing-by-type-areas.

In order to achieve the above objects, the disclosure provides a wrapper. A front top of the wrapper is provided with a first opening for placing in and taking out goods. A cover sheet for shielding first opening is arranged on the wrapper at a position corresponding to the first opening. A first connecting member is arranged on a back of the wrapper. The wrapper is detachably connected to a carrier by the first connecting member. A wrapping strap wrapper is arranged on both sides of a back top of the wrapper, and the wrapping strap includes a length-adjustable structure.

Compared with the related art, the first connecting member of the wrapper of the disclosure may be connected to the carrier, so as to mount the wrapper on the carrier, which may increase a storage space of the carrier and meet the need of placing goods by types with a simple and practical structure. Meanwhile, the first connecting member of the wrapper of the disclosure may still be detached from the carrier, so as to detach the wrapper from the carrier. In order to allow the wrapper usable for user after being detached, a wrapping strap is arranged on both sides of a back top of the wrapper, and the wrapping strap includes a length-adjustable structure. After the wrapper is mounted on the carrier, the length of the wrapping strap may be adjusted to make the wrapping strap be hidden between the wrapper and the carrier. After the wrapper is detached from the carrier, the length of the wrapping strap may be adjusted to a length required for crossing or hand-carrying, so the wrapper may be used as a messenger bag or a handbag. It can be seen, the wrapper of the disclosure may be mounted on the carrier, which may both increase the storage space of the carrier and meet the need of placing goods by types, and the wrapper may still be used independently at the same time.

Preferably, the wrapper of the disclosure is provided with a second connecting member for closing or opening the first opening, and the second connecting member is connected to a front edge of the cover sheet.

Preferably, the wrapper of the disclosure is provided with a second connecting member, the second connecting member closes the first opening and the cover sheet covers the second connecting member.

Preferably, the carrier of the disclosure is a child carrier, and the first connecting member is used to detachably connect to at least one of the peripheral shields of a basket of the child carrier. Preferably, the first connecting member is used to be in a detachable connection with the back shield of the basket of the child carrier.

Preferably, the second connecting member and the first connecting member of the disclosure are adhesive sheets or snap fasteners or magnets or zippers.

Preferably, the wrapper of the disclosure and the wrapping strap are in a detachable connection. In such detachable connection, when the wrapper is mounted on the carrier, the wrapping strap may be detached and placed into the wrapper; and when the wrapper needs to be independently used alone after being detached from the carrier, the wrapping strap may be taken from the wrapper and mounted on the wrapper, and the length of the wrapping strap may be adjusted according to the need at the same time, such that the wrapper may be used independently as a messenger bag or a handbag.

Preferably, the both sides of the back top of the wrapper are provided with wrapping strap buckles for detachably connecting to the wrapping strap.

Preferably, the back of the wrapper of the disclosure is further provided with an interlayer, and a third connecting member for correspondingly cooperating with the first connecting member is arranged at an opening of the interlayer. After the wrapper is detached from the carrier, the opening of the interlayer may be closed by combining the first connecting member and the third connecting member, so as to improve the aesthetic feeling of the wrapper and prevent the goods stored in the interlayer from falling out; moreover, if the opening of the interlayer is opened, the combined first and third connecting members may be separated from each other, so the wrapper may be connected to the carrier by the first connecting member.

Preferably, a patch is formed extending outward at a center of a bottom of the wrapper, a fourth connecting member is arranged on the patch, and a fifth connecting member for correspondingly cooperating with the fourth connecting member is arranged on an outside of a bottom of the basket and a side of the wrapper. After the wrapper is mounted on the peripheral shields, the patch may be attached to the fifth connecting member on an outside of the bottom of the basket, which may connect the bottom of the wrapper to the basket, such that the wrapper look more three-dimensional and aesthetic; moreover, when the wrapper is detached and used as a bag, the patch may be attached to the fifth connecting member on the side of the wrapper, which may hide the patch and make the appearance of the wrapper cleaner.

Preferably, the fourth connecting member and the fifth connecting member of the disclosure are in a combination form of an adhesive sheet, a snap button or a magnet.

The disclosure further provides a baby carriage with a multiple storage structure comprising a carriage frame and a basket arranged on the carriage frame. The basket includes peripheral shields, and further includes a wrapper arranged on an outside portion of the peripheral shields and detachably connected to at least one of the peripheral shields. A front top of the wrapper is provided with a first opening for placing in and taking out goods. A cover sheet for shielding the first opening is arranged on the wrapper at a position corresponding to the first opening. A first connecting member for detachably connecting to the peripheral shields is arranged on a back of the wrapper. A wrapping strap is arranged on both sides of the back top of the wrapper, and the wrapping strap includes a length-adjustable structure.

Compared with the related art, the wrapper may be detachably connected to the peripheral shields of the basket of the baby carriage with a multiple storage structure of the disclosure. After the wrapper is mounted on the peripheral shields, the wrapper may meet both needs of storing goods and placing goods by types, so the baby carriage with a multiple storage structure of the disclosure may further increase the storage space of the baby carriage and the number of the sorted types by adding the wrapper with a storage function. After the wrapper is detached from the peripheral shields, the wrapper may still be used independently as a messenger bag or a handbag.

Preferably, the wrapper and the wrapping strap of the disclosure are in a detachable connection, and the both sides of the back top of the wrapper are provided with wrapping strap buckles for detachably connecting to the wrapping strap. By such detachable connection, when the wrapper is mounted on the baby carriage with a multiple storage structure, the wrapping strap may be detached and placed into the wrapper; and if the wrapper needs to be used independently after it is detached from the carrier, the wrapping strap may be taken from the wrapper and then the wrapping strap may be mounted on the wrapper again, and the length of the wrapping strap may be adjusted according to requirement in use at the same time, so the wrapper may be used independently as a messenger bag or a handbag.

Preferably, the back of the wrapper of the disclosure is further provided with an interlayer, and a third connecting member for correspondingly cooperating with the first connecting member is arranged at an opening of the interlayer. After the wrapper is detached from the baby carriage with a multiple storage structure, the opening of the interlayer may be closed by combining the first connecting member and the third connecting member, so as to improve the aesthetic feeling of the wrapper and prevent goods stored in the interlayer from falling out; moreover, the combined first and third connecting members may be separated from each other by opening the opening of the interlayer, and then the wrapper may be connected to the baby carriage with a multiple storage structure by the first connecting member.

Preferably, a patch is formed extending outward at a center of a bottom of the wrapper of the disclosure, and a fourth connecting member is arranged on the patch, furthermore, a fifth connecting member for correspondingly cooperating with the fourth connecting member is arranged on an outside of a bottom of the basket and a side of the wrapper. After the wrapper is mounted on the peripheral shields of the baby carriage with a multiple storage structure, the patch is attached to the fifth connecting member on an outside of the bottom of the basket, which may can connect the bottom of the wrapper to the basket, so as to make the wrapper look more three-dimensional and aesthetic; moreover, if the wrapper is detached to be used as a bag, the patch may be attached to the fifth connecting member on the side of the wrapper, which may hide the patch and make the appearance of the wrapper cleaner.

Preferably, a sixth connecting member for correspondingly cooperating with the first connecting member is arranged above an outside portion of the peripheral shields of the disclosure.

Preferably, the carriage frame of the disclosure is further provided with a seat, and a storage member connected to the seat is arranged below the seat, moreover, a gap formed between the storage member and the seat constitutes a storage interlayer for storing goods, and the storage interlayer is provided with second openings for placing in and taking out goods.

Preferably, two opposite sides of the storage member of the disclosure are connected to the seat, and the second openings are respectively formed between each of the other two opposite sides of the storage member and the seat.

Preferably, a side of the storage member of the disclosure close to the seat is provided with a fastener for adjusting a size of the storage interlayer.

Preferably, the fastener of the disclosure is a zipper, and the zipper includes a first zipper part and a second zipper part arranged in a V shape.

Preferably, the fastener of the disclosure includes a first buckle and several second buckles being connectable to the first buckle and arranged at intervals, and a size of the gap formed between the storage member and the seat is adjustable by moving connection positions of the first buckle and the second buckles.

DETAILED DESCRIPTION

In order to describe the technical content and structural features of the disclosure in detail, the following illustration is provided conjunction with the embodiments and the accompanying drawings.

Figure 1:
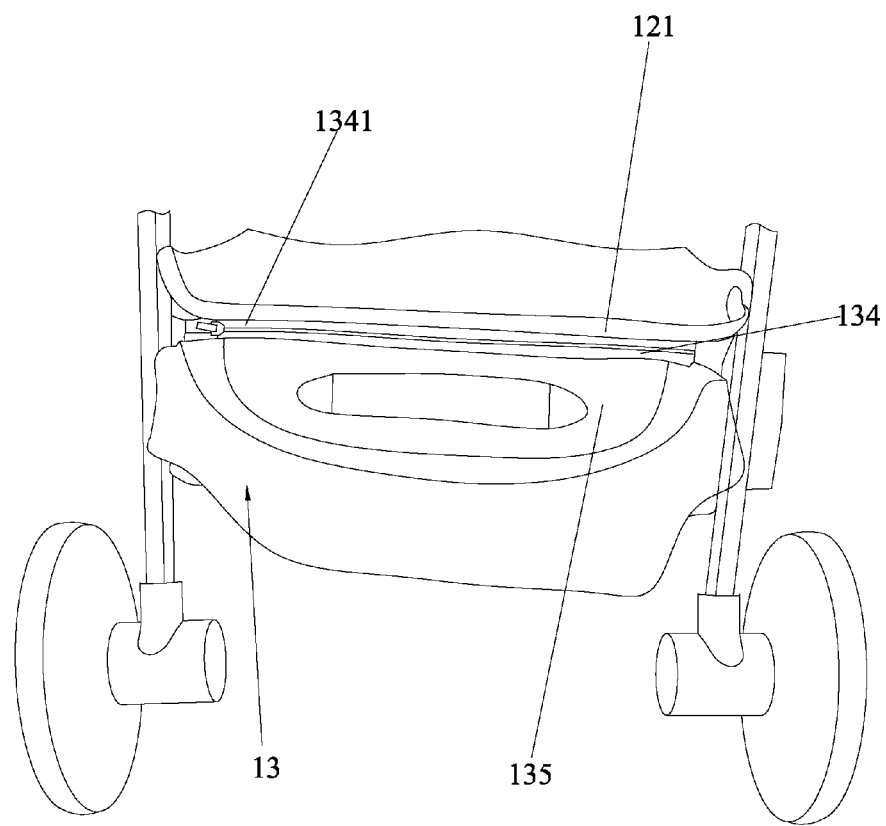
FIG. 1 is a schematic view of a connection between a wrapper and its peripheral shields of the disclosure.
Figure 2:
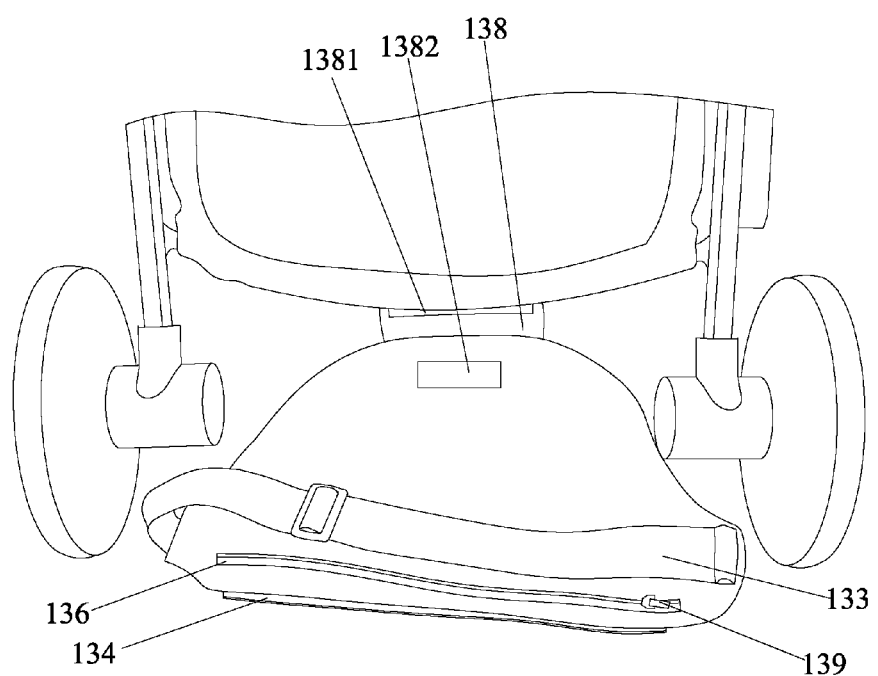
FIG. 2 is a schematic structural view of a back of the wrapper of the disclosure.
Figure 3:
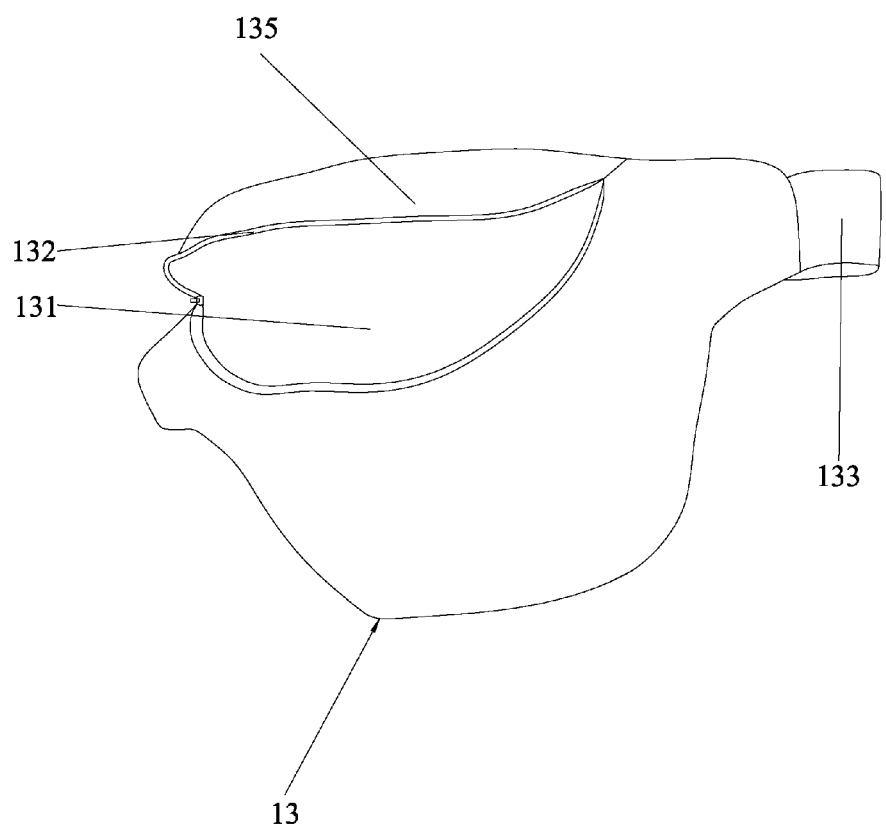
FIG. 3 is a schematic structural view of a friend of the wrapper of the disclosure.

Please refer to FIGS. 1-3, a front top of a wrapper 13 of the disclosure is provided with a first opening 131 for placing in or taking out goods, while a cover sheet 135 for shielding the first opening 131 is arranged on the wrapper 13 at a position corresponding to the first opening 131. Specifically, there is a first connecting member 134 on the back of the wrapper 13, and the wrapper 13 is detachably connected to a carrier by the first connecting member 134. The first connecting member 134 of the wrapper 13 of the disclosure may be used for connecting to the carrier, so as to mount the wrapper 13 on the carrier, which may increase a storage space of the carrier and meet the needs for placing goods by types with a simple and practical structure. Meanwhile, the first connecting member 134 of the wrapper 13 of the disclosure may also be detached from the carrier, so as detach the wrapper 13 from the carrier. In order to make the wrapper 13 available after detachment for the user to use alone, a wrapping strap 133 is arranged on both sides of a back top of the wrapper 13. The wrapping strap 133 includes a length-adjustable structure. After the wrapper 13 is mounted on the carrier, a length of the wrapping strap 133 may be adjusted to make the wrapping strap be hidden between the wrapper 13 and the carrier. After the wrapper 13 is detached from the carrier, the length of the wrapping strap 133 may be adjusted to a length required for crossing or hand-carrying, so the wrapper may be used as a messenger bag or a handbag. It can be seen, the wrapper 13 of the disclosure may be mounted on the carrier, which may both increase the storage space of the carrier and meet the need of placing goods by types, and the wrapper 13 may still be detached and used independently at the same time.

Please refer to FIG. 3, in order to prevent the goods contained in the wrapper 13 from falling out, the wrapper 13 is provided with a second connecting member 132 for closing or opening the first opening 131. The second connecting member 132 is connected to a front edge of the cover sheet 135. Of course, the second connecting member 132 may not be connected to the front edge of the cover sheet 135, and the second connecting member 132 is positioned at the first opening 131, that is, after the second connecting member 132 closes the first opening 131, the cover sheet 135 may cover the second connecting member 132. Specifically, the second connecting member 132 and the first connecting member 134 are adhesive sheets or snap fasteners or magnets or zippers.

Specifically, the wrapper 13 and the wrapping strap 133 are detachably connected to each other. Please refer to FIG. 4, both sides of the back top of the wrapper 13 are provided with wrapping strap buckles 137 for detachably connecting to the wrapping strap 133. After the wrapper 13 is mounted on the carrier, the wrapping strap 133 may be disconnected from the wrapping strap buckles 137, so that the wrapping strap 133 is placed in the wrapper 13; moreover, after the wrapper 13 is detached from the carrier, if it is needed to independently use the wrapper 13, the wrapping strap 133 may be taken out of the wrapper 13, and then both ends of the wrapping strap 133 are respectively connected to the wrapping strap buckles 137 on the wrapper 13, and in turn, the length of the wrapping strap 133 is adjusted such that the wrapper may be used independently as a messenger bag or a handbag.

Figure 4:
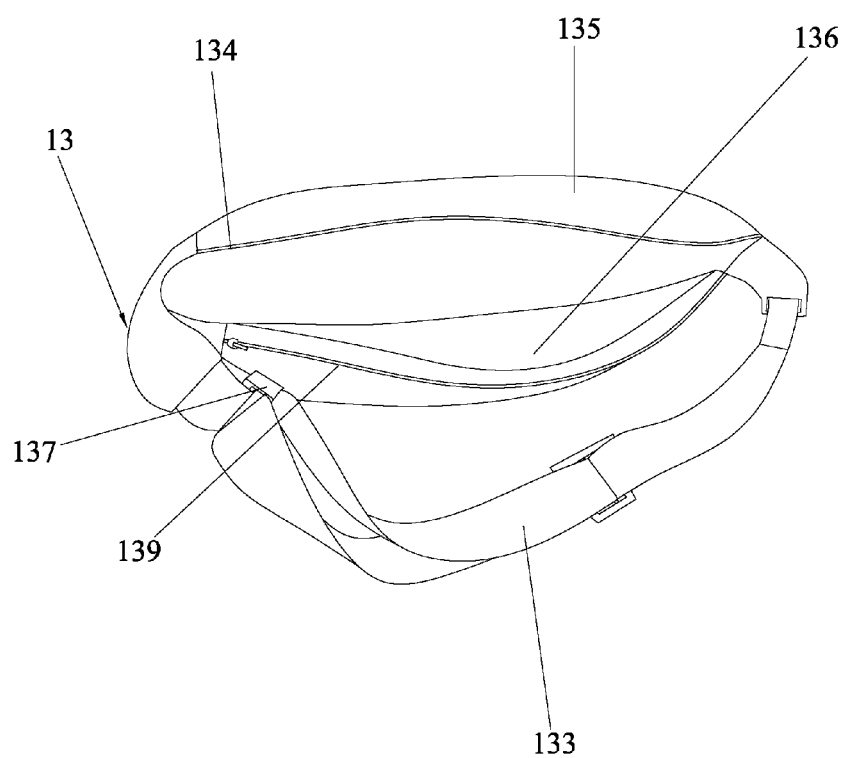
FIG. 4 is a schematic structural view of the wrapper of the disclosure after an interlayer on its back is stretched open.

Please continuously refer to FIG. 4, in order to facilitate the collection of small goods such as bank cards, ID cards, etc., the back of the wrapper 13 of the disclosure is further provided with an interlayer 136. A third connecting member 139 is arranged at the opening of the interlayer 136 for correspondingly cooperating with the first connecting member 134. After the wrapper 13 is detached from the carrier, by combining the first connecting member 134 and third connecting member 139, the opening of the interlayer 136 may be closed, so as to improve the aesthetic feeling of the wrapper 13 and prevent the goods contained in the interlayer 136 from falling out, Moreover, by open the opening of the interlayer 136, the first connecting member 134 and the third connecting member 139 combined together may be separated, and further, the wrapper 13 may be connected to the carrier by the first connecting member 134.

Specifically, the carrier may be a child carrier, so the first connecting member 134 is used to detachably connect to at least one of the peripheral shields of the basket of the child carrier. The child carrier may specifically be a baby carriage or a crib. It would be noted, whether it is a baby carriage or a crib, the mounting and detaching principles are the same as those of the wrapper 13, and accordingly, the following description will only takes the carrier being a baby carriage as an example.

Please refer to FIGS. 1-5, the baby carriage 100 with a multiple storage structure provided by the disclosure comprises a carriage frame 11 and a basket 12 arranged on the carriage frame 11. The basket 12 includes one or more peripheral shields 121, and the peripheral shields 121 include a back shield 1211. When there a plurality types of goods and they need to be placed by type, since the basket 12 has only a limited space, it is difficult to meet the user's needs for storing goods and placing goods by types, resulting in inconvenience for the user and increasing the hand's burden and difficulty. Accordingly, the baby carriage 100 with a multiple storage structure of the disclosure further comprises the wrapper 13 which is arranged on an outer side of the peripheral shields 121 and is detachably connected to at least one of the peripheral shields 121. In order to maintain the aesthetic feeling of the baby carriage 100 with a multiple storage structure, the wrapper 13 is preferably detachably connected the back shield 1211. After the wrapper 13 is mounted on the peripheral shields 121, the length of the wrapping strap 133 is adjusted to make the wrapping strap be hidden between the wrapper 13 and the peripheral shields 121; moreover, after the wrapper 13 is detached, the wrapping strap 133 is adjusted to a length required for crossing or hand-carrying, so the wrapper may be used as a messenger bag or a handbag. It can be seen, the wrapper 13 of the disclosure may be mounted on the peripheral shields 121 the basket 12 of the baby carriage 100 with a multiple storage structure, which may both increase the storage space of the baby carriage 100 with a multiple storage structure and meet the need of placing goods by types; meanwhile, the wrapper 13 may still be detached and used independently.

Please continuously refer to FIG. 2, a patch 138 is formed extending outward at a center of a bottom of the wrapper 13 of the disclosure. A fourth connecting member 1381 is arranged on the patch 138, and a fifth connecting member 1382 cooperating with the fourth connecting member 1381 correspondingly is arranged on an outside of the bottom of the basket 12 and a side of the wrapper 13. After the wrapper 13 is mounted on the peripheral shields 121, patch 138 is attached to the fifth connecting member (not shown in FIG. 2) on the outside of the bottom of the basket 12, which can connect the bottom of the wrapper 13 to the basket 12 so as to make the wrapper 13 look more three-dimensional and aesthetic. When the wrapper 13 is detached for use as a bag, the fourth connecting member 1381 on the patch 138 may be attached to the fifth connecting member 1382 on the side of the wrapper 13, such that the patch 138 may be hidden to make the wrapper 13 look neater. Preferably, the fourth connecting member 1381 and the fifth connecting member 1382 may be in a combination form of an adhesive sheet, a snap button or a magnet.

Please continuously refer to FIG. 1, a sixth connecting member 1341 cooperating with the first connecting member 134 accordingly is arranged above an outside portion of the peripheral shields 121 of the baby carriage 100 with a multiple storage structure of the disclosure. By the first connecting member 134 and the sixth connecting member 1341 cooperating with each other, the wrapper 13 and the peripheral shields 121 are in a detachable connection. Preferably, the first connecting member 134 and the sixth connecting member 1341 are in a combination form of a zipper or a snap button.

Figure 5:
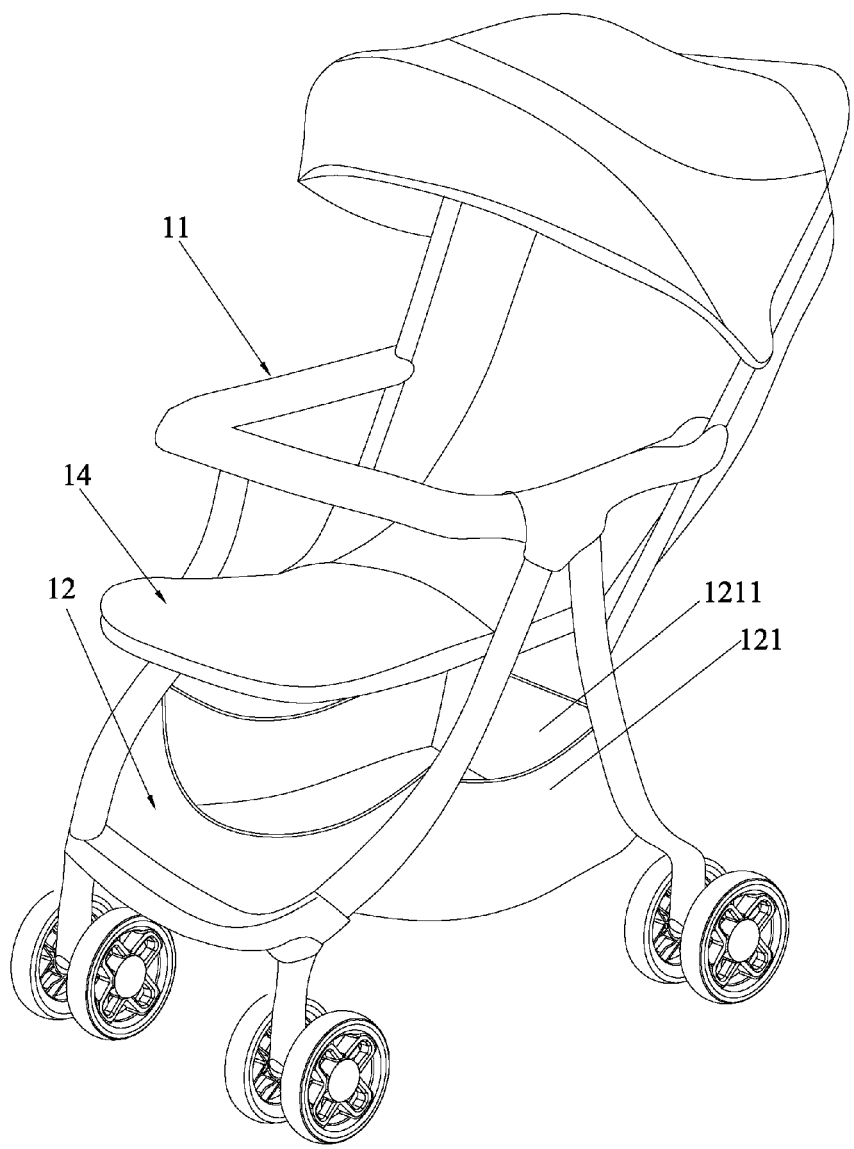
FIG. 5 is a schematic structural view of the baby carriage with a multiple storage structure of the disclosure.
Figure 6:
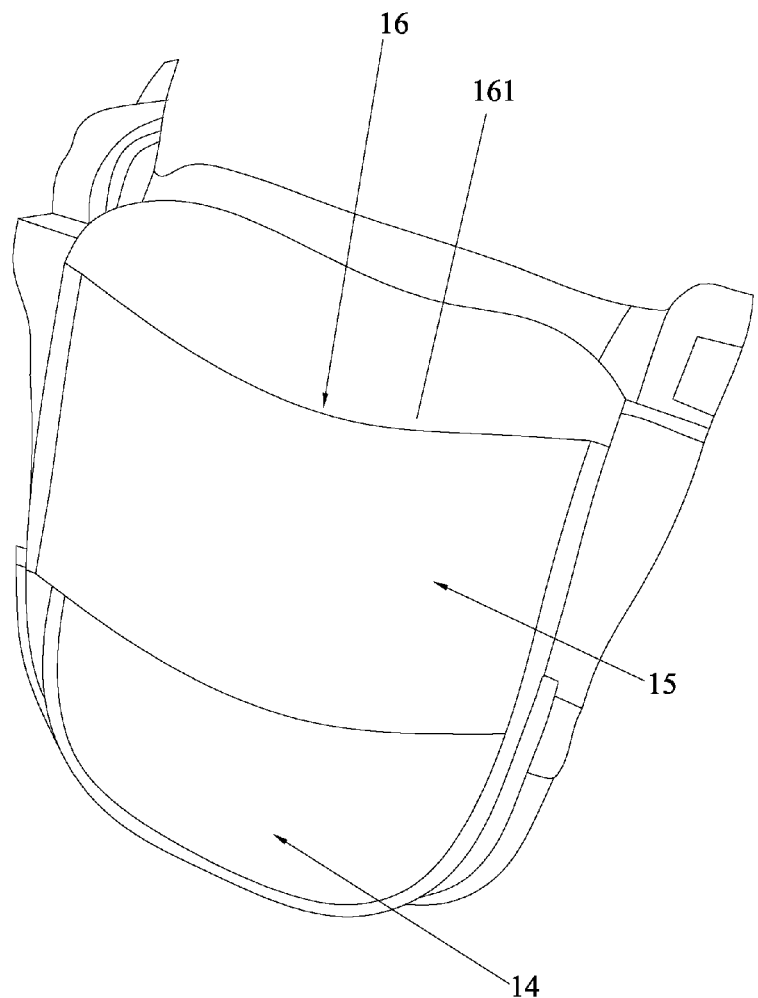
FIG. 6 is a schematic structural view of a storage member connected to a seat of the disclosure.

Please refer to FIGS. 5 and 6, the carriage frame 11 of the baby carriage 100 with a multiple storage structure of the disclosure is further provided with a seat 14, and a storage member 15 connected to the seat 14 is arranged below the seat 14. A gap formed between the storage member 15 and the seat 14 constitutes a storage interlayer 16 for storing goods. By the additionally arranged the storage interlayer 16, the number of storage structures in the baby carriage 100 with a multiple storage structure is further increased, which not only further increases the storage space, but also further increases the number of the placing-by-type-areas. The storage interlayer 16 is provided with second openings 161 for putting in or taking out goods. Any brought or purchased goods may be put into the storage interlayer 16 from the opening 161. Specifically, the seat 14 and the storage member 15 are fixedly connected to each other by an interval. Of course, the seat 14 and the storage member 15 may also be detachably and fixedly connected to each other by a zipper. In order to facilitate the user to put in or take out goods from both sides of the storage interlayer 16, the two opposite sides of the storage member 15 of the disclosure are connected to the seat 14, and second openings 161 are formed between each of the other two opposite sides of the storage member 15 and the seat 14, respectively, that is, the storage interlayer 16 for storing goods is provided with two openings.

Figure 7:
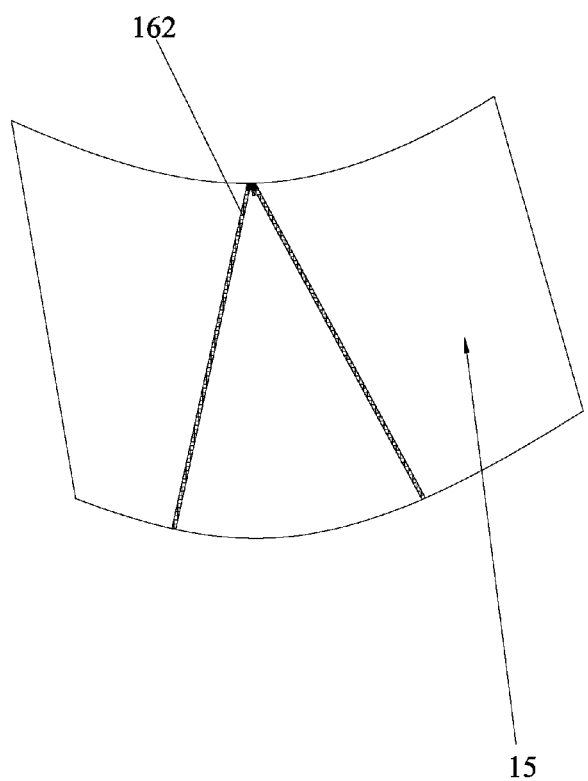
FIG. 7 shows a fastener of a specific embodiment of the disclosure.

Specifically, the storage member 15 of the disclosure is provided with a fastener 162 on a side close to the seat 14. The fastener 162 is used to adjust the size of the storage interlayer 16. Please refer to FIG. 7, the fastener 162 may be a zipper, and the zipper includes a first zipper part and a second zipper part. The first zipper part and the second zipper part are arranged in a V shape. After the first zipper part and the second zipper part arranged in a V shape are closed, a V-shaped area on the storage member 15 is folded so that the gap formed between the storage member 15 and the seat 14 becomes smaller. Moreover, after the closed first and second zipper parts are opened, the folded area on the storage member 15 may be unfolded, so that the gap formed between the storage member 15 and the seat 14 becomes larger. Of course, the fastener 162 may also include a first buckle and several second buckles which may be connected to the first buckle and arranged at intervals. By moving the connection positions of the first buckle and the second buckles, the area between the first buckle and the second buckles on the storage member 15 may be folded or unfolded, so that the gap formed between the storage member 16 and the seat 14 becomes smaller or larger. It can be seen, due to the presence of the fastener 162, the user may flexibly adjust the size of the gap formed between the storage member 15 and the seat 14 according to the number of goods, thereby adjusting the size of the storage interlayer 16.

Please continuously refer to FIGS. 1-7, the baby carriage 100 with a multiple storage structure of the disclosure comprises a carriage frame 11, a basket 12 and a seat 14 arranged on the carriage frame 11, wherein an outside portion of peripheral shields 121 of the basket 12 is provided with a wrapper 13, the wrapper 13 and the peripheral shields 121 are in a detachable connection, and a top of the wrapper 13 is provided with a first opening 131 for putting in or taking out goods, while a cover sheet 135 for shielding the first opening 131 is arranged on the wrapper 13 at a position corresponding to the first opening 131. Specifically, there is a first connecting member 134 on a back of the wrapper 13, and the wrapper 13 is detachably connected to the baby carriage 100 with a multiple storage structure by the first connecting member 134, the back of the wrapper 13 is also arranged a wrapping strap 133 including a length-adjustable structure, and a patch 138 is formed extending outward at a center of a bottom of the wrapper 13, which may make the appearance of the wrapper 13 more three-dimensional. In addition, a storage member 15 connected to the seat 14 is arranged on a lower side of the seat 14, and a gap formed between the storage member 15 and the seat 14 constitutes a storage interlayer 16 for storing goods. The storage interlayer 16 is provided with second openings 161 for placing in and taking out goods. Brought or purchased goods may be put into the storage interlayer 16 from the openings 161. Moreover, a fastener 162 for adjusting the size of the storage interlayer 16 is arranged on a side of the storage member 15 close to the seat 14. It can be seen, in the baby carriage 100 with a multiple storage structure of the disclosure, an outside portion of the back shield 121 of the basket 13 is provided with a detachable wrapper 13. The wrapper 13 may satisfy both requirements of storing goods and placing goods by types, and at the same time, the wrapper 13 may be detached and used independently. Meanwhile, the storage member 15 under the seat 14 may further increase the storage space and the number of the placing-by-type-areas in the baby carriage 100 with a multiple storage structure, and the user may flexibly adjust the size of the gap formed between the storage member 15 and the seat 14 according the number of goods and adjust the size of the storage interlayer 16 in turn.

It would be noted, the specific structure of carriage frame 11 in the baby carriage 100 with a multiple storage structure of the disclosure is well known to those skilled in the art, and thus will not be described in detail here.

What disclosed above are only preferred embodiments of the disclosure, and the scope of the disclosure certainly cannot be limited by this. Therefore, any equivalent changes made according to the scope of the disclosure still belong to the disclosure.

What is claimed is:

1. A wrapper comprising:
   a front top provided with a first opening for placing in or taking out goods,
   a cover sheet for shielding the first opening being arranged on the wrapper at a position corresponding to the first opening,
   a first connecting member being arranged on a back of the wrapper, the wrapper being detachably connected to a carrier by the first connecting member, wherein the back of the wrapper is further provided with an interlayer, and an interlayer connecting member for correspondingly cooperating with the first connecting member is arranged at an opening of the interlayer.

2. The wrapper according to claim 1, wherein the wrapper is provided with a second connecting member for closing or opening the first opening, and the second connecting member is connected to a front edge of the cover sheet.

3. The wrapper according to claim 2, wherein the second connecting member and the first connecting member are adhesive sheets, snap fasteners, magnets, or zippers.

4. The wrapper according to claim 1, wherein the wrapper is provided with a second connecting member, the second connecting member closes the first opening and the cover sheet covers the second connecting member.

5. The wrapper according to claim 1, wherein the carrier is a child carrier, and the first connecting member is used to detachably connect to at least one peripheral shields of a basket of the child carrier.

6. The wrapper according to claim 5, wherein a patch is formed extending outward at a center of a bottom of the wrapper, a fourth connecting member is arranged on the patch, and a fifth connecting member for correspondingly cooperating with the fourth connecting member is arranged on an outside of a bottom of the basket and a side of the wrapper.

7. The wrapper according to claim 6, wherein the fourth connecting member and the fifth connecting member are in a combination form of an adhesive sheet, a snap button or a magnet.

8. The wrapper according to claim 1, wherein a wrapping strap is arranged on both sides of a back top of the wrapper, the wrapping strap includes a length-adjustable structure, and the wrapper and the wrapping strap are in a detachable connection.

9. The wrapper according to claim 8, wherein both sides of the back top of the wrapper are provided with wrapping strap buckles for detachably connecting to the wrapping strap.

10. A baby carriage with a multiple storage structure, the baby carriage comprising:
a carriage frame and a basket arranged on the carriage frame, the basket includes peripheral shields, and
a wrapper arranged on an outside portion of the peripheral shields and detachably connected to at least one of the peripheral shields, the wrapper comprising:
a front top provided with a first opening for placing in or taking out goods,
a cover sheet for shielding the first opening being arranged on the wrapper at a position corresponding to the first opening,
a first connecting member for detachably connecting to the peripheral shields being arranged on the wrapper,
wherein a patch is formed extending outward at a center of a bottom of the wrapper, a patch connecting member is arranged on the patch, and a basket connecting member for correspondingly cooperating with the patch connecting member is arranged on an outside of a bottom of the basket and a side of the wrapper.

11. The baby carriage with a multiple storage structure according to claim 10, wherein the wrapper and a wrapping strap are in a detachable connection, and both sides of the back top of the wrapper are provided with wrapping strap buckles for detachably connecting to the wrapping strap.

12. The baby carriage with a multiple storage structure according to claim 10, wherein the back of the wrapper is further provided with an interlayer, and a third connecting member for correspondingly cooperating with the first connecting member is arranged at an opening of the interlayer.

13. The baby carriage with a multiple storage structure according to claim 10, wherein a sixth connecting member for correspondingly cooperating with the first connecting member is arranged above an outside portion of the peripheral shields.

14. A baby carriage with a multiple storage structure, the baby carriage comprising:
a carriage frame with a seat, wherein a storage member connected to the seat is arranged below the seat, a gap formed between the storage member and the seat constitutes a storage interlayer for storing goods, and the storage interlayer is provided with second openings for placing in and taking out goods.

15. The baby carriage with a multiple storage structure according to claim 14, wherein the baby carriage further comprises:
a basket arranged on the carriage frame, the basket comprising peripheral shields;
a wrapper arranged on an outside portion of the peripheral shields and detachably connected to at least one of the peripheral shields, the wrapper comprising:
a front top provided with a first opening for placing in or taking out goods;
a cover sheet for shielding the first opening is arranged on the wrapper at a position corresponding to the first opening;
a first connecting member for detachably connecting to the peripheral shields is arranged on a back of the wrapper.

16. The baby carriage with a multiple storage structure according to claim 14, wherein two opposite sides of the storage member are connected to the seat, and the second openings are respectively formed between each of the other two opposite sides of the storage member and the seat.

17. The baby carriage with a multiple storage structure according to claim 14, wherein a side of the storage member close to the seat is provided with a fastener for adjusting a size of the storage interlayer.

18. The baby carriage with a multiple storage structure according to claim 17, wherein the fastener is a zipper, and the zipper includes a first zipper part and a second zipper part arranged in a V shape.

19. The baby carriage with a multiple storage structure according to claim 17, wherein the fastener includes a first buckle and several second buckles being connectable to the first buckle and arranged at intervals, and a size of the gap formed between the storage member and the seat is adjustable by moving connection positions of the first buckle and the second buckles.

20. The baby carriage with a multiple storage structure according to claim 10, wherein a wrapping strap is arranged on both sides of the back top of the wrapper, and the wrapping strap includes a length-adjustable structure.

* * * * *